(12) United States Patent
El-Gayyar (10) Patent No.: US 10,394,267 B2
(45) Date of Patent: Aug. 27, 2019

(54) ELECTRICAL DEVICE, NETWORK AND METHOD OF CONTROLLING THE SAME

(71) Applicant: EATON CORPORATION, Cleveland, OH (US)

(72) Inventor: Ahmed El-Gayyar, Senoia, GA (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 421 days.

(21) Appl. No.: 14/845,441

(22) Filed: Sep. 4, 2015

(65) Prior Publication Data

US 2017/0068267 A1 Mar. 9, 2017

(51) Int. Cl.

| | |
|---|---|
| G05B 11/01 | (2006.01) |
| G05B 15/02 | (2006.01) |
| G05B 13/02 | (2006.01) |
| G05B 19/02 | (2006.01) |
| G05B 19/042 | (2006.01) |
| G05F 1/66 | (2006.01) |
| H04W 4/80 | (2018.01) |
| H05B 37/02 | (2006.01) |
| G05B 9/03 | (2006.01) |

(52) U.S. Cl.
CPC ............. *G05F 1/66* (2013.01); *G05B 15/02* (2013.01); *H04W 4/80* (2018.02); *H05B 37/0272* (2013.01); *G05B 9/03* (2013.01); *G05B 2219/2642* (2013.01)

(58) Field of Classification Search
CPC .......... G05F 1/66; G05B 15/02; H04W 4/008; H05B 37/0272

USPC .......................................................... 700/22
See application file for complete search history.

(56) References Cited

U.S. PATENT DOCUMENTS

| | | | | |
|---|---|---|---|---|
| 9,021,139 | B1* | 4/2015 | Kim | H04W 12/06 |
| | | | | 709/250 |
| 9,363,860 | B1* | 6/2016 | Lowchareonkul | ........................ |
| | | | | H05B 33/0857 |
| 9,655,219 | B2* | 5/2017 | Chen | H05B 39/044 |
| 2006/0007151 | A1* | 1/2006 | Ram | G06F 3/03543 |
| | | | | 345/163 |
| 2006/0044152 | A1 | 3/2006 | Wang | |
| 2006/0075934 | A1* | 4/2006 | Ram | B60N 3/004 |
| | | | | 108/44 |
| 2007/0132733 | A1* | 6/2007 | Ram | G06F 3/0227 |
| | | | | 345/163 |
| 2008/0225809 | A1* | 9/2008 | Guo | H04W 40/246 |
| | | | | 370/338 |
| 2010/0141153 | A1* | 6/2010 | Recker | H05B 33/0803 |
| | | | | 315/149 |

(Continued)

*Primary Examiner* — Ly D Pham
(74) *Attorney, Agent, or Firm* — Eckert Seamans Cherin & Mellott, LLC (57) ABSTRACT

An electrical device including a wireless communication unit structured to wirelessly communicate with other electrical devices and a processor structured to check if the electrical device is part of a network of other electrical devices. The processor is structure to create a new network and add other electrical devices to the new network if the electrical device is not part of the network of other electrical devices and to remain in the network of other electrical devices if the electrical device is part of the network of other electrical devices. The electrical device further includes a function module structured to provide an additional function associated with a type of the electrical device.

10 Claims, 4 Drawing Sheets

(56) References Cited

U.S. PATENT DOCUMENTS

| | | | | |
|---|---|---|---|---|
| 2010/0148940 A1* | 6/2010 | Gelvin | G06F 15/173 | 340/286.02 |
| 2010/0180019 A1* | 7/2010 | Elston, III | H04L 12/2809 | 709/222 |
| 2011/0109249 A1* | 5/2011 | Liu | H05B 33/0809 | 315/307 |
| 2011/0121654 A1* | 5/2011 | Recker | H02J 9/065 | 307/66 |
| 2011/0149874 A1* | 6/2011 | Reif | H04W 48/18 | 370/329 |
| 2011/0204778 A1* | 8/2011 | Sadwick | H05B 33/0827 | 315/34 |
| 2012/0080944 A1* | 4/2012 | Recker | H02J 9/02 | 307/25 |
| 2012/0188998 A1* | 7/2012 | Philips | H04W 56/001 | 370/350 |
| 2012/0262093 A1* | 10/2012 | Recker | H05B 33/0854 | 315/308 |
| 2012/0286672 A1* | 11/2012 | Holland | H05B 37/0272 | 315/154 |
| 2013/0134875 A1* | 5/2013 | Qin | H05B 33/0809 | 315/85 |
| 2013/0169165 A1* | 7/2013 | Sadwick | H05B 37/02 | 315/152 |
| 2013/0175931 A1* | 7/2013 | Sadwick | H05B 37/02 | 315/158 |
| 2013/0307434 A1* | 11/2013 | Zhang | H05B 41/3924 | 315/219 |
| 2013/0342131 A1* | 12/2013 | Recker | H05B 33/0842 | 315/292 |
| 2014/0005809 A1* | 1/2014 | Frei | H04L 29/1249 | 700/90 |
| 2014/0097758 A1* | 4/2014 | Recker | H05B 37/0272 | 315/152 |
| 2014/0164562 A1* | 6/2014 | King | H04W 8/005 | 709/217 |
| 2014/0265900 A1* | 9/2014 | Sadwick | H05B 33/0803 | 315/200 R |
| 2015/0123553 A1* | 5/2015 | Huang | H05B 33/0815 | 315/200 R |
| 2015/0204561 A1* | 7/2015 | Sadwick | F24F 11/006 | 236/1 C |
| 2015/0296599 A1* | 10/2015 | Recker | H05B 37/0272 | 315/153 |
| 2016/0043962 A1* | 2/2016 | Kim | H04W 4/008 | 709/224 |
| 2016/0095187 A1* | 3/2016 | Chen | H05B 39/044 | 315/155 |
| 2017/0055325 A1* | 2/2017 | Rodinger | H05B 33/0803 | |
| 2017/0105265 A1* | 4/2017 | Sadwick | A61N 5/0618 | |
| 2017/0111981 A1* | 4/2017 | Recker | H05B 33/0854 | |
| 2017/0227965 A1* | 8/2017 | Decenzo | H04L 67/025 | |
| 2017/0231058 A1* | 8/2017 | Sadwick | H05B 33/0857 | |

* cited by examiner

ELECTRICAL DEVICE, NETWORK AND METHOD OF CONTROLLING THE SAME

CROSS-REFERENCE TO RELATED APPLICATION

This application is related to co-pending U.S. patent application Ser. No. 14/845,498 filed on Sep. 4, 2015, entitled "ELECTRICAL DEVICE WITH ASSOCIATED SETTINGS AND SYSTEM INCLUDING THE SAME", the entirety of which is incorporated herein by reference.

BACKGROUND

Field

The disclosed concept relates generally to electrical devices, and more particularly, to electrical devices in wireless communication. The disclosed concept also relates to networks of electrical devices and methods of controlling electrical devices.

Background Information

Controlled electrical devices in buildings include, without limitation, lighting fixtures and outlets. Many other types of electrical devices may also be controlled. These electrical devices are generally controlled by a switch. In order to control the electrical device with the switch, wires are run from a load center of the building to the electrical device through the switch. The wiring is generally installed during construction of the building and it can be difficult to install or reroute wiring after a building is complete. As such, once an electrical device and its associated switch are installed and wired, their locations are difficult to change. Additionally, it is difficult to associate the electrical device with a different switch or to associate different electrical devices with the already installed switch.

In order to address some of the difficulties addressed above, wireless lighting control systems have been developed. One such system is described in U.S. Patent Application Publication No. 2006/0044152. Prior wireless lighting control systems form a network including several devices such as lights, switches and sensors. The switches are able to wirelessly communicate commands via the network to the lights to control the lights. The switches do not need to be wired to the lights, and thus, it is easier to change the locations of the switches and the lights they are associated with. However, in prior wireless lighting control systems, the network of devices is setup through a master controller. The lights, switches and sensors are joined to the network by pairing them with the master controller. Communication on the network is routed through the master controller. For example, a switch sends a command to one of the lights via the master controller.

In prior wireless lighting control systems, a master controller is required for each network of devices. The devices in the network could not be paired with each other without purchasing the master controller. As the number of devices in the network becomes smaller, the cost of the master controller becomes a larger percentage of the cost of the network. For a consumer that wants to setup a small network of devices, even though it is not economical, the consumer is required to purchase the master controller in order to setup the network.

There is room for improvement in electrical devices.

There is also room for improvement in networks of electrical devices and methods of controlling electrical devices.

SUMMARY

These needs and others are met by embodiments of the disclosed concept, which are directed to an electrical device structured to check if it is part of a network of other electrical devices and to create a new network if it is not part of the network of other electrical devices. The electrical device also includes a function module structured to provide an additional function associated with a type of the electrical device. These needs and others are also met by a network of electrical devices and a method of controlling electrical devices.

In accordance with aspects of the disclosed concept, an electrical device comprises: a wireless communication unit structured to wirelessly communicate with other electrical devices; a processor structured to check if the electrical device is part of a network of other electrical devices and: a) to create a new network and add other electrical devices to the new network if the electrical device is not part of the network of other electrical devices, and b) to remain in the network of other electrical devices if the electrical device is part of the network of other electrical devices; and a function module structured to provide an additional function associated with a type of the electrical device.

In accordance with other aspects of the disclosed concept, a network comprises: a plurality of electrical devices, each electrical device including: a wireless communication unit structured to wirelessly communicate with other electrical devices on the network; a processor structured to check if the electrical device is part of a network of other electrical devices and: a) to create a new network and add other electrical devices to the new network if the electrical device is not part of the network of other electrical devices, and b) to remain in the network of other electrical devices if the electrical device is part of the network of other electrical devices; and a function module structured to provide an additional function associated with a type of the electrical device.

In accordance with other aspects of the disclosed concept, a method of controlling an electrical device comprises: determining, with the electrical device, whether the electrical device is in a network with other electrical devices; and a) if the electrical device is not in the network with other electrical devices, creating a new network and adding other electrical devices to the new network, and b) if the electrical device is in the network of other electrical devices is detected, remaining in the network of other electrical devices, wherein the electrical device includes a function module structured to provide a function associated with a type of the electrical device.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the term "processor" shall mean a programmable analog and/or digital device that can store, retrieve and process data; a controller; a control circuit; a computer; a workstation; a personal computer; a microprocessor, a microcontroller; a microcomputer, a central processing unit; a mainframe computer, a mini-computer, a server; a networked processor; or any suitable processing device or apparatus.

Figure 1:
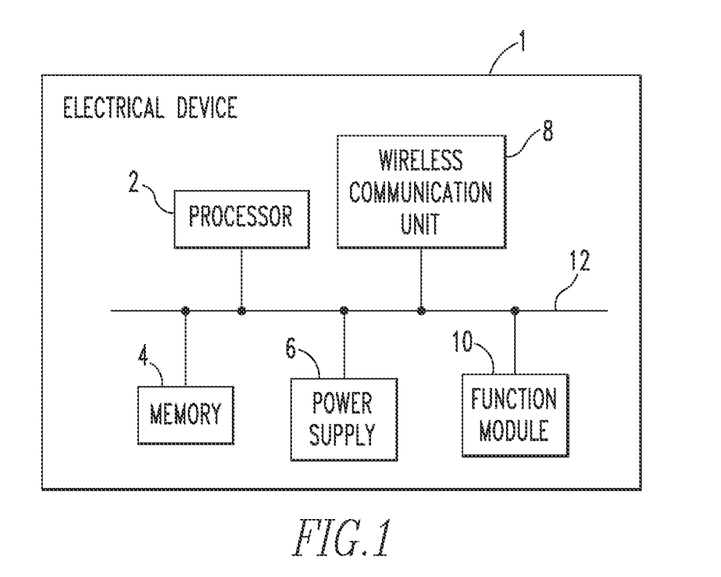
FIG. 1 is a schematic diagram of an electrical device in accordance with an example embodiment of the disclosed concept.

FIG. 1 is a schematic diagram of an electrical device 1 in accordance with an example embodiment of the disclosed concept. The electrical device includes a processor 2, a memory 4, a power supply 6, a wireless communication unit 8 and a function module 10.

The processor 2 may be, for example and without limitation, a microprocessor, a microcontroller, or some other suitable processing device or circuitry. The memory 4 may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory.

The power supply 6 provides power to operate the components of the electrical device 1. In some example embodiments of the disclosed concept, the power supply 6 may be, for example and without limitation, a self-contained power supply such as, without limitation, a battery or another suitable self-contained power supply. In some example embodiments of the disclosed concept, the power supply 6 may receive external power, such as utility power, and provide it to the components of the electrical device 1. The power supply 6 may convert the external power (e.g., without limitation, alternating current to direct current conversion, level shifting, etc.) for use by the electrical device.

The wireless communication unit 8 is structured to wirelessly communicate with other electrical devices. The wireless communication unit 8 may wirelessly communicate using any suitable communication protocol such as, for example and without limitation, cellular, wi-fi, Bluetooth, Zigbee, Z-wave or any other suitable wireless communication protocol.

The function module 10 is a module that provides a function associated with a type of the electrical device 1 (e.g., without limitation, switch, light, outlet, etc.). The function module 10 may include physical and/or electrical elements that are associated with the function it provides. The function module 10 may differ between different types of electrical devices 1, some of which will be described in more detail with respect to FIGS. 2-4.

The electrical device 1 further includes a bus 12. The bus 12 may carry electrical signals between components of the electrical device 1. The electrical signals may be, without limitation, communication signals or power.

The electrical device 1 is structured to check if it is in a network with other electrical devices and, if the electrical device 1 is not in the network of other electrical devices, to create a network and add other electrical devices. In the case that the electrical device 1 is in the network of other electrical devices is detected, the electrical device 1 is structured to remain in the network of other electrical devices. The processor 2 is structured to implement routines to check if the electrical device 1 is in the network with other electrical devices and to create a new networks and add other electrical devices to the new network. The routines may be stored in the processor 2 and/or the memory 4.

When the electrical device 1 belongs to a network of other electrical devices, the electrical devices in the network may wirelessly communicate with each other. For example and without limitation, when the type of the electrical device 1 is a switch and the type of one of the other electrical devices is a light, the electrical device 1 may wirelessly communicate with the other electrical device to control it to turn on or off. The processor 2 is structured to control the wireless communication between the electrical devices 1 via the wireless communication unit 8.

The electrical device 1 is able to create a network as well as provide an additional function associated with its type via the function module 10. A network of electrical devices 1 does not require a separate specialized controller to set up the network, and thus, it is more convenient and cost effective to create a network of electrical devices 1 than it is to create a network of devices that require a separate specialized controller. For example, when a user plans a network using only certain types of electrical devices 1, the user need only purchase those types of electrical devices 1 and does not need to purchase a separate specialized controller.

Figure 2:
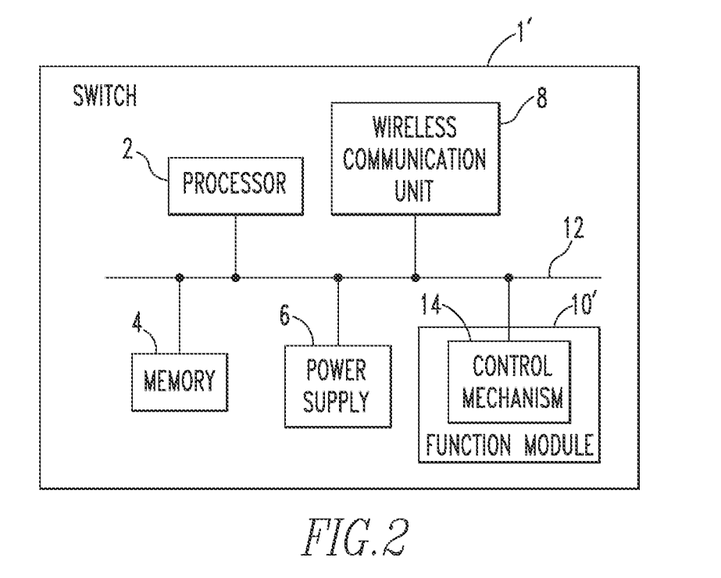
FIG. 2 is a schematic diagram of a switch type electrical device in accordance with an example embodiment of the disclosed concept.

Referring to FIG. 2, an example embodiment of the electrical device 1 of FIG. 1 is shown. In FIG. 2, the type of the electrical device 1 is a switch 1'. The switch 1' provides the function of controlling one or more other electrical devices (e.g., without limitation, lights) to turn on or off. The switch 1' includes a processor 2, a memory 4, a power supply 6, a wireless communication unit 8 and a bus 12 similar to the electrical device 1 of FIG. 1. However, the switch 1' includes a function module 10' that provides functionality associated with a switch.

The function module 10' includes a control mechanism 14. The control mechanism 14 is a combination of a physical element that a user may actuate (e.g., without limitation, a button, a flip switch, a knob, etc.) and an electrical element that outputs a signal in response to the actuation. The control mechanism 14 is electrically connected to the bus 12. The processor 2 is structured to receive the output of the control mechanism 14 and to responsively wirelessly communicate with one or other electrical devices that are on a network with the switch 1' to turn on or off.

Figure 3:
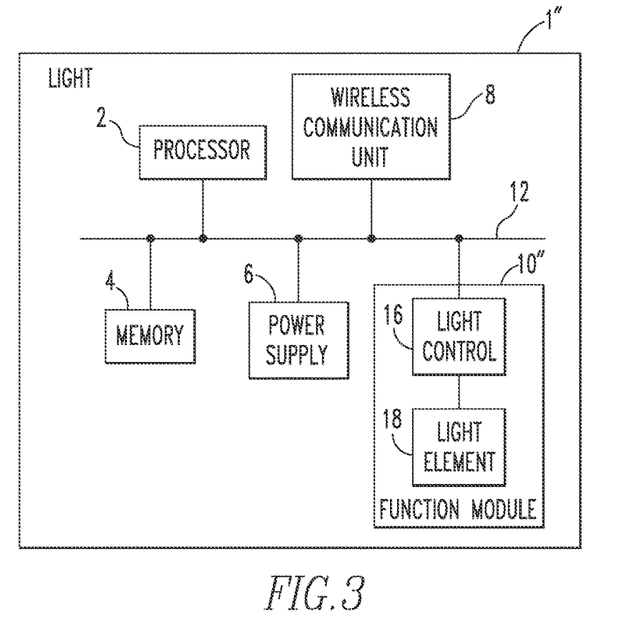
FIG. 3 is a schematic diagram of a light type electrical device in accordance with an example embodiment of the disclosed concept.

Referring to FIG. 3, another example embodiment of the electrical device 1 of FIG. 1 is shown. In FIG. 3, the type of the electrical device 1 is a light 1". The light 1" provides the function of turning on or turning off a light element 18 included in the light 1". The light 1" includes a processor 2, a memory 4, a power supply 6, a wireless communication unit 8 and a bus 12 similar to the electrical device 1 of FIG. 1. However, the light 1" includes a function module 10" that provides functionality associated with a light.

The function module 10" includes a light control unit 16 and the light element 16. The light control unit 16 is electrically connected to the bus 12. The processor 2 is structured to communicate with the light control unit 16 to cause the light control unit 16 to turn on or turn off the light element 18. The processor 2 is structured to communicate with the light control unit 16 based on wireless communication received by the light 1" from other electrical devices (e.g., without limitation, the switch 1' of FIG. 2) that it is networked with. In some example embodiments of the disclosed concept, the light control unit 16 is structured to turn on the light element 18 by providing it with power from the power supply 6 and to turn off the light element 18 by preventing it from receiving power from the power supply 6. The light element 18 may be any suitable type of light element such as, without limitation, one or more light emitting diodes (LED), an incandescent light, a fluorescent light, a high-intensity discharge light (HID) or any other suitable type of light element.

Figure 4:
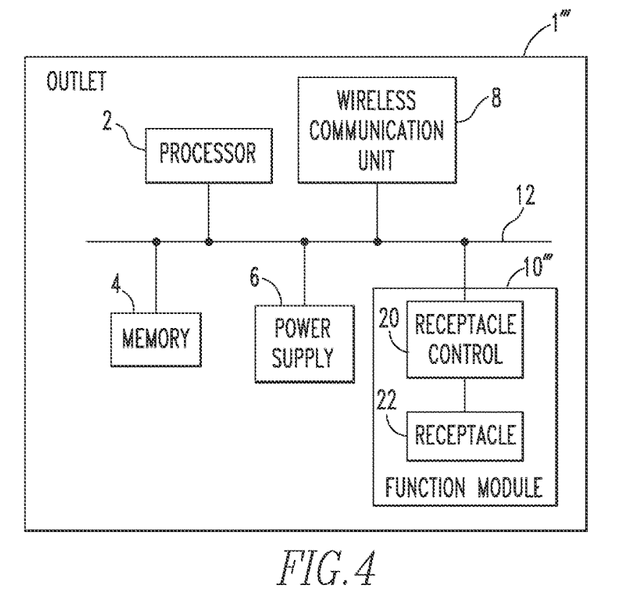
FIG. 4 is a schematic diagram of an outlet type electrical device in accordance with an example embodiment of the disclosed concept.

Referring to FIG. 4, another example embodiment of the electrical device 1 of FIG. 1 is shown. In FIG. 4, the type of the electrical device 1 is an outlet 1'''. The outlet 1''' provides the function of an electrical outlet that is capable of being turned on or off. The outlet 1''' includes a processor 2, a memory 4, a power supply 6, a wireless communication unit 8 and a bus 12 similar to the electrical device 1 of FIG. 1. However, the outlet 1''' includes a function module 10''' that provides functionality associated with an outlet.

The function module 10''' includes a receptacle control 20 and a receptacle 22. The receptacle control is electrically connected to the bus 12. The processor 2 is structured to communicate with the receptacle control 20 to cause the receptacle control to turn on or turn off the receptacle 22. The processor 2 is structured to communicate with the receptacle control based on wireless communication received by the outlet 1''' from other electrical devices (e.g., without limitation, the switch 1' of FIG. 2) that it is networked with. In some example embodiments of the disclosed concept, the receptacle control 20 is structured to turn on the receptacle 22 by providing it with power from the power supply 6 and to turn off the receptacle 22 by preventing it from receiving power from the power supply 6. The receptacle 22 is a physical element that devices may be plugged into to receive electricity. When the receptacle 22 is turned on, it is electrically coupled to the power supply 6 and may provide power to a connected device, and when the receptacle 22 is turned off, the receptacle 22 does not provide power to a connected device.

Figure 5:
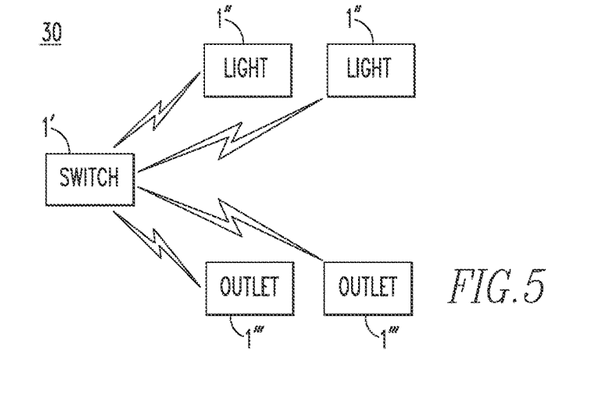
FIG. 5 is a schematic diagram of a network of electrical devices in accordance with an example embodiment of the disclosed concept.

FIG. 5 is a schematic diagram of a network 30 of electrical devices in accordance with an example embodiment of the disclosed concept. The network 30 includes a switch 1', two lights 1" and two outlets 1'''. However, it will be appreciated that the number and types of electrical devices included in the network may be varied without departing from the scope of the disclosed concept. Any one of the switch 1', the two lights 1" or two outlets 1''' may be used to initially create a network and the remaining devices may then join the created network.

In the network 30, the switch 1', lights 1" and outlets 1''' are able to wirelessly communicate with each other. For example and without limitation, the switch 1' may wirelessly communicate with the lights 1" and outlets 1''' to cause them to turn on or off in response to a user actuating the switch 1'. It will be appreciated that in various example embodiments of the disclosed concept, any of the devices may wirelessly communicate with any of the other devices. For example and without limitation, in some example embodiments of the disclosed concept, the light 1" are able to wirelessly communicate with the outlets 1''' to control the outlets.

In some example embodiments of the disclosed concept, the electrical devices may be associated with selected other electrical devices on the network 30. For example and without limitation, the switch 1' may be associated with one of the lights 1" and one of the outlets 1'''. Another switch 1' may then be added to the network 32 and associated with the other one of the lights 1" and the other one of the outlets 1'''.

While a switch 1', a light 1" and an outlet 1''' have been shown as example embodiments of types of the electrical device 1 of FIG. 1, it will be appreciated that other types of electrical devices may also be employed. For example and without limitation, sensors (e.g., without limitation, motion sensors, light sensors, temperature sensors, etc.), fans, thermostats, air conditioning units or any other suitable type of electrical device may be employed as the type of the electrical device 1 without departing from the scope of the disclosed concept.

Figure 6:
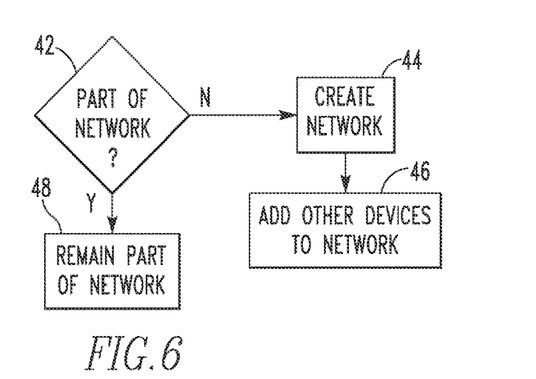
FIG. 6 is a flowchart of a method of creating or remaining in a network in accordance with an example embodiment of the disclosed concept.

FIG. 6 is a flowchart of a method of creating or remaining in a network that may be implemented by the electrical device 1 of FIG. 1 in, for example and without limitation, the processor 2. It will also be appreciated that the method of FIG. 6 may be implemented by example embodiments of the electrical device of FIG. 1 such as, without limitation, the switch 1' of FIG. 2, the light 1" of FIG. 3 or the outlet 1''' of FIG. 4.

The electrical device 1 checks whether it is part of a network of other electrical devices at 42. If the electrical device 1 is part of the network of other electrical devices 1, the electrical device 1 remains part of the network of other electrical devices at 48. If the electrical device 1 is not part of the network of other electrical devices, the electrical device 1 creates a new network at 44 and adds other electrical devices to the new network at 46.

Figure 7:
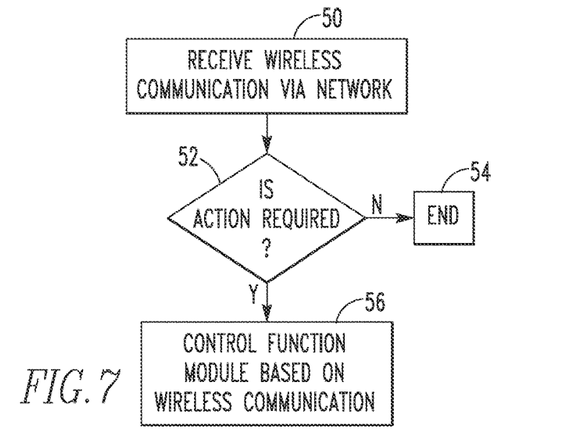
FIG. 7 is a flowchart of a method of receiving wireless communication in accordance with an example embodiment of the disclosed concept.

FIG. 7 is a flowchart of a method receiving wireless communication that may be implemented by the electrical device 1 of FIG. 1 in, for example and without limitation, the processor 2. It will also be appreciated that the method of FIG. 6 may be implemented by example embodiments of the electrical device of FIG. 1 such as, without limitation, the switch 1' of FIG. 2, the light 1" of FIG. 3 or the outlet 1''' of FIG. 4.

The electrical device 1 receives wireless communication via the network at 50. At 52, the electrical device 1 determines whether action in response to the wireless communication is needed. For example and without limitation, if the wireless communication is addressed to another electrical device on the network, no action would be required. If the electrical device 1 determines that no action is required, it proceeds to 54 and ends the routine. However, if the electrical device 1 determines that action is required, it proceeds to 56 and controls the function module 10 based on the received wireless communication. For example and without limitation, a light 1″ that receives a wireless communication from an associated switch 1′ indicating that it should turn on would, in response, control it function module 10″ to turn on its light element 18.

Figure 8:
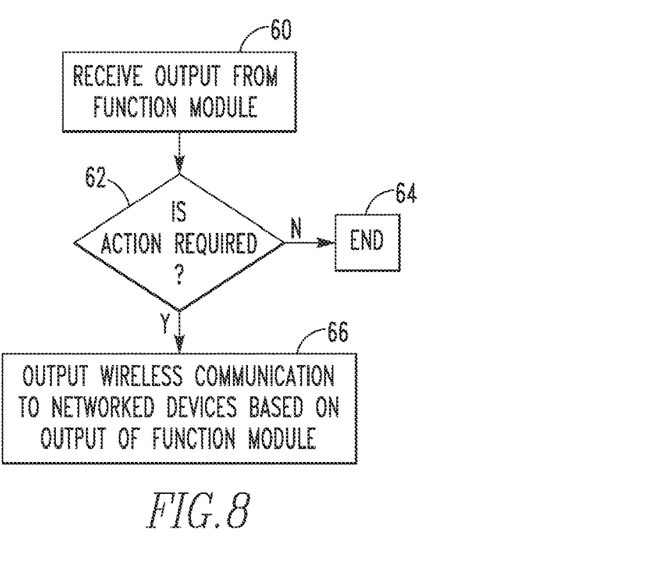
FIG. 8 is a flowchart of a method of sending wireless communication in accordance with an example embodiment of the disclosed concept.

FIG. 8 is a flowchart of a method of sending wireless communication that may be implemented by the electrical device 1 of FIG. 1 in, for example and without limitation, the processor 2. It will also be appreciated that the method of FIG. 6 may be implemented by example embodiments of the electrical device of FIG. 1 such as, without limitation, the switch 1′ of FIG. 2, the light 1″ of FIG. 3 or the outlet 1‴ of FIG. 4.

The electrical device 1 receives an output from the function module 10 at 60. At 62, the electrical device 1 determines whether action is required in response to the output of the function module 10. If the electrical device 1 determines that no action is required, it proceeds to 64 and ends the routine. However, if the electrical device 1 determines that action is required in response to the output of the function module 10, the electrical device 1 proceeds to 66 and outputs a wireless communication to networked devices based on the output of the function module. For example and without limitation, a switch 1′ receiving an output from its function module 10′ indicating that the control mechanism 14 has been actuated would responsively output a wireless communication to the network indicating that associated electrical devices should turn on or off.

Figure 9:
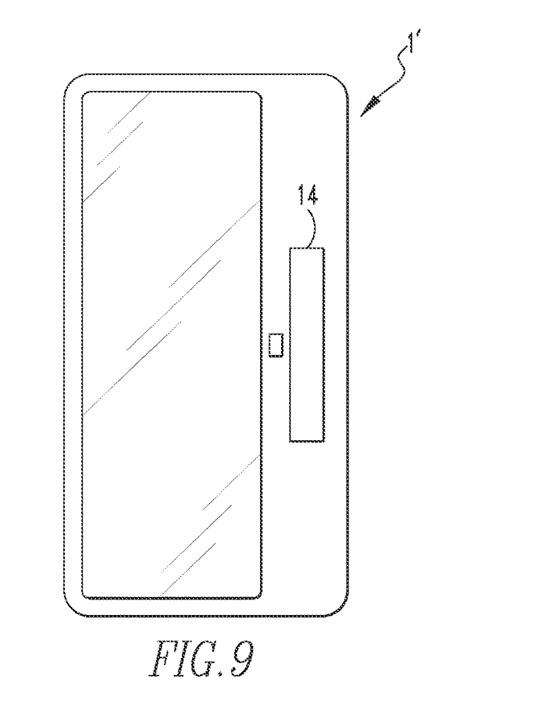
FIG. 9 is a front view of a switch type electrical device in accordance with an example embodiment of the disclosed concept.

FIG. 9 is a front view of an example embodiment of the switch 1′ of FIG. 2. In this example embodiment the switch 1′ has a rectangular shape and the control mechanism 14 includes a button located at a lower portion of the switch 1′. While FIG. 9 shows one example of a physical design of the switch 1′, it will be appreciated that any physical design of the switch 1′ or other types of electrical devices 1 may be employed without departing from the scope of the disclosed concept.

The disclosed concept can also be embodied as computer readable codes on a tangible, non-transitory computer readable recording medium. The computer readable recording medium is any data storage device that can store data which can be thereafter read by a computer system. Non-limiting examples of the computer readable recording medium include read-only memory (ROM), non-volatile random-access memory (RAM), CD-ROMs, magnetic tapes, floppy disks, disk storage devices, and optical data storage devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A switch comprising:
a wireless communication unit structured to wirelessly communicate with other electrical devices;
a processor structured to check if the switch is part of a network of other electrical devices and:
  a) to create a new network and add other electrical devices to the new network if the switch is not part of the network of other electrical devices, and
  b) to remain in the network of other electrical devices if the switch is part of the network of other electrical devices; and
a function module including a control mechanism having a physical element structured to be actuated by a user; and wherein the processor is structured to control the wireless communication unit to output a wireless communication to one or more other electrical devices on the network in response to the physical element being actuated by the user to cause the one or more other electrical devices to turn on or off.

2. The switch of claim 1, further comprising:
a power supply structured to provide power to operate the switch.

3. The switch of claim 2, wherein the power supply is a self-contained power supply.

4. The switch of claim 2, wherein the power supply is structured to receive power from an external power source and convert the received power for use by the switch.

5. A system comprising:
at least one outlet structured to wirelessly communicate with other devices on the network and being structured to turn on and turn off in response to a wireless communication; and
a switch including:
  a wireless communication unit structured to wirelessly communicate with the at least one outlet on the network;
  a processor structured to check if the switch is part of a network with the at least one outlet and:
    a) to create a new network and add the at least one outlet to the new network if the switch is not part of the network with the at least one outlet, and
    b) to remain in the network with the at least one outlet if the switch is part of the network with the at least one outlet; and
  a function module including a control mechanism having a physical element structured to be actuated by a user,
  wherein the processor is structured to control the wireless communication unit to output the wireless communication to the at least one outlet on the network in response to the physical element being actuated by the user to cause the at least one outlet to turn on or off.

6. A method of controlling a switch including a wireless communication unit, a processor, and a function module, the method comprising:
determining, with the processor, whether the switch is in a network with other electrical devices;
  a) if the switch is not in the network with other electrical devices, creating a new network and adding other electrical devices to the new network, and
  b) if the switch is in the network of other electrical devices, remaining in the network of other electrical devices,
wherein the function module includes a control mechanism having a physical element structured to be actuated by a user; and
controlling the wireless communication unit, with the processor, to output a wireless communication to one or more other electrical devices on the network in response to the physical element being actuated by the user to cause the one or more other electrical devices to turn on or off.

7. The method of claim 6, further comprising:
receiving an output from the function module;

determining if an action is required in response to the output of the function module; and if it is determined that action is required, outputting a wireless communication to the other electrical devices based on the output of the function module.

8. The switch of claim 1, wherein the wireless communication unit is structured to wirelessly communicate using a Z-wave communication protocol.

9. The switch of claim 1, wherein the processor is structured to add at least four other electrical devices to the new network.

10. The switch of claim 1, wherein the network of other electrical devices includes an outlet.

* * * * *